UNITED STATES PATENT OFFICE.

DONALD STEWART, OF INVERNESS, SCOTLAND.

MANUFACTURE OF TANNING EXTRACTS.

No. 909,343.

Specification of Letters Patent.

Patented Jan. 12, 1909.

Application filed May 17, 1907. Serial No. 374,240.

*To all whom it may concern:*

Be it known that I, DONALD STEWART, M. A. Edin., a subject of the King of Great Britain, residing at 99 Ardross street, Inverness, Scotland, have invented new and useful Improvements in the Manufacture of Tanning Extracts, of which the following is a specification.

Several proposals have from time to time been made, some of which have found practical application, to utilize the waste sulfite liquors of the paper pulp manufacture in the manufacture of tanning extracts. In some cases the sulfite liquors have been the source of the tannin in the extract; in other cases the sulfite liquors have been used in conjunction with other tannin containing material or a tannin containing extract.

Hitherto it has always been regarded as necessary to subject the sulfite liquors or the product of treating other tannin containing material or a tannin containing extract with such sulfite liquor, to some chemical treatment prior to concentration by evaporation. Such chemical treatment was designed to eliminate some one or more constituents of the sulfite liquor whose presence prior to concentration was regarded as disadvantageous. Careful investigation of the subject has revealed to me the fact that apart from a possible excess of iron the sulfite liquors can be used in conjunction with tannin containing material or extract in the manufacture of tanning extracts. I have as a result of my investigations established what has never been hitherto recognized (a) that the iron in the sulfite liquors is the only possibly disadvantageous constituent thereof, and (b) that even the presence of the iron in the sulfite liquors may within limits be disregarded.

As the result of analyses which I have made to determine the chemical composition of the sulfite liquors which at present are available I have found that the percentage of iron (hereinafter to be always understood as calculated as FeO) in the ash of such liquors varies considerably. In some cases it is as low as nearly four per cent. and in others it is as high as nearly fourteen per cent., and this percentage may vary within even wider limits. In general my experience is that the sulfite liquors obtainable on the European continent, for example the French and German liquors, generally contain a percentage of iron in the ash approximating to the higher limit, and that the American and Canadian liquors contain a percentage of iron in the ash approximating to the lower limit.

According to my present invention I select for the purpose of manufacturing tanning extracts sulfite liquors whose ash contains not more than say six per cent. of iron in the ash or by suitable chemical means as by the addition of milk of lime or caustic soda I precipitate so much of the iron content of the sulfite liquor that the ash from the filtered liquor contains only about six per cent. or less of iron therein and employ such filtered liquor in manufacturing tanning extracts or I use for the purpose of tanning a bath composed as hereinafter described containing as one source of tannin sulfite liquor selected or treated as aforesaid.

I will now proceed to describe how in accordance with my present invention I manufacture tanning extracts and prepare a bath for tanning.

Hemlock, mangrove, oak, chestnut or other tannin containing material, having been previously ground or suitably prepared for extraction, is placed in vats or pits suitably constructed, and I add sulfite liquors selected or treated as aforesaid either of the concentration as received from the factory or diluted with water. These liquors are passed successively through the various vats of tannin containing material, and as the temperature is raised they extract the tannin, and at the same time they have a bleaching effect. As the liquor percolates through the tannin containing material, certain gummy substances are filtered off, and certain of the lime and iron salts which the liquors may contain are to a large extent eliminated by the process of percolation. The resulting liquor is then put into a large settling tank, where difficultly soluble substances are allowed to settle. The clear liquor is then concentrated in vacuum pans, or by any other suitable method of concentration, until the liquor has reached a density suitable for transport, when it may be barreled, it is then ready for use in the tanyard. During the heating of the liquors in the concentrating pans an interaction takes place between the sulfites in the liquor and the tannin; the sulfurous acid which is liberated having as stated above a slight bleaching effect upon the tannin improves the color of the resulting fluid. I may make use of oxalic acid or any other suitable acid to blend with the liquor to liberate more or less of the combined sulfurous acid, so as to get a further bleaching action if desired.

As an alternative I treat a tanning extract with a sulfite liquor selected or treated as aforesaid. In such case the tanning extract is treated with the sulfite liquor in the manner described above in respect of a tannin containing material, i. e., the tanning extract and waste sulfite liquor are put in a settling tank where difficultly soluble substances are allowed to settle. The clear liquor is then concentrated in vacuum pans or by any other suitable method of concentration until the liquor has reached a suitable density. As a further alternative I may blend sulfite liquors selected or treated as aforesaid direct with the aqueous solutions of hemlock, oak, chestnut or other tannin containing material in any suitable proportion. If these blends are to be used direct by the tanner without concentration I recommend the warming of the liquor, so that a perfect blending of the solutions takes place.

What I claim is:—

1. The process of manufacturing tanning extracts and liquors, consisting in adding waste sulfite liquor, whose ash contains not more than 6% of iron calculated as FeO, to tannin-containing material.

2. A tanning liquor or extract consisting of a tanning extract and waste sulfite liquor whose ash contains not more than 6% of iron calculated as FeO.

3. The process of manufacturing tanning extracts and liquors, consisting in removing from waste sulfite liquor the iron therein until the ash contains not more than 6% of iron calculated as FeO, and adding such liquor to tannin-containing material.

4. The process of manufacturing tanning extracts and liquors, which consists in passing successively through vats or pits containing tannin-containing material waste sulfite liquor whose ash contains not more than 6% of iron calculated as FeO.

5. The process of manufacturing tanning extracts and liquors, which consists in passing successively through vats or pits containing tannin-containing material waste sulfite liquor whose ash contains not more than 6% of iron calculated as FeO, and then settling out difficultly soluble substances and concentrating the clear liquor.

6. The process of manufacturing tanning extracts and liquors, which consists in adding waste sulfite liquor whose ash contains not more than 6% of iron calculated as FeO, to tannin extracts and settling out difficultly soluble substances and concentrating the clear liquor.

7. A tanning extract consisting of an extract of hemlock and a waste sulfite liquor whose ash contains not more than 6% of iron calculated as FeO.

DONALD STEWART.

Witnesses:
WILLIAM P. QUANN,
HENRY A. BOTHWELL.